(12) United States Patent
Benitez et al.

(10) Patent No.: US 8,466,917 B2
(45) Date of Patent: Jun. 18, 2013

(54) METHOD AND SYSTEM FOR MODELING LIGHT

(75) Inventors: Ana Belen Benitez, Los Angeles, CA (US); Dong-Qing Zhang, Burbank, CA (US); James Arthur Fancher, Los Angeles, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 864 days.

(21) Appl. No.: 12/515,340

(22) PCT Filed: Nov. 20, 2006

(86) PCT No.: PCT/US2006/044988
§ 371 (c)(1),
(2), (4) Date: May 18, 2009

(87) PCT Pub. No.: WO2008/063168
PCT Pub. Date: May 29, 2008

(65) Prior Publication Data
US 2010/0049488 A1   Feb. 25, 2010

(51) Int. Cl.
*G06T 15/00* (2006.01)

(52) U.S. Cl.
USPC ........... 345/426; 345/419; 345/427; 345/582; 345/589; 382/190; 382/255; 382/274

(58) Field of Classification Search
USPC ................ 345/419, 426, 427, 581, 582, 589, 345/629; 382/1, 3, 20, 21, 64, 600, 190, 255, 382/274
See application file for complete search history.

(56) References Cited

U.S. PATENT DOCUMENTS 5,261,041 A * 11/1993 Susman ................. 345/473

FOREIGN PATENT DOCUMENTS

| GB | 2358919 | 8/2001 |
|----|---------|--------|
| JP | 2000276613 | 10/2000 |
| JP | 2002117413 | 4/2002 |
| JP | 2003202296 | 7/2003 |
| JP | 2004260579 | 9/2004 |
| JP | 2006506745 | 2/2006 |
| WO | 2004047008 | 6/2004 |

OTHER PUBLICATIONS

Abad F., et al. : "Integrating synthetic objects into real scenes" Computers and Graphics, Elsevier, GB vol. 27, No. 1, Feb. 2003, pp. 5-17, Claims 1,2,4,6-9,11-30.

(Continued)

*Primary Examiner* — Phu K Nguyen
(74) *Attorney, Agent, or Firm* — Robert D. Shedd; Vincent E. Duffy; James McKenzie

(57) ABSTRACT

A method and system for modeling light in time and space are provided. The method and system of the present disclosure collect light readings, e.g., on a motion picture set, at different positions and times to build a light model to be used for visual effects (VFX) compositing. The light model represents the light distribution across space and/or time for a predetermined physical space. Using the light model, the lighting can then be predicted or interpolated at intermediate or other positions and/or times for which no specific light readings were obtained. The light models can be used for rendering objects (e.g., natural or CG elements) in a scene as if they were in that space.

15 Claims, 6 Drawing Sheets

OTHER PUBLICATIONS

Debevec Paul, "Virtual Cinematography: Relighting through computation" IEEE Computer, vol. 39, No. 8, Aug. 2006, pp. 57-65, Claims 1,6-8,11-15,17-19, 30.

Debevec P., Association for computing machinery: "Rendering synthetic objects into real scenes" Computer Graphics, Jul. 19-24, 1998, pp. 189-198, Claims 1,11-14,20,29,30.

Search Report dtd., Jan. 16, 2008.

Drago F et al, "Validation proposal for global illumination and rendering techniques" Computers and Graphics, vol. 25, No. 3, Jun. 2011, pp. 511-518.

* cited by examiner

025# METHOD AND SYSTEM FOR MODELING LIGHT

This application claims the benefit under 35 U.S.C. §365 of International Application PCT/US2006/044988, filed Nov. 20, 2006, which was published in accordance with PCT article 21(2) on May 29, 2008, in English.

TECHNICAL FIELD OF THE INVENTION

The present disclosure generally relates to computer graphics processing and display systems, and more particularly, to a method and system for modeling light in time and space.

BACKGROUND OF THE INVENTION

For the production of motion pictures, it is often desirable to combine digitally rendered images with images of a real scene such as may be captured by traditional film cameras or by more modern digital cameras. For example, it may be desirable to digitally create visual effects (VFX) within a filmed scene that would be more expensive or even impossible to achieve using traditional special effects tools. Yet, it is also desirable that the visual effects appear to be completely real so as to preserve the illusion of reality. Methods for rendering digital objects for insertion into photographic images, including what is sometimes referred to as "image-based lighting," are known in the art. In brief, image-based lighting refers to the practice of gathering real-world information about lighting at a particular point in a photographed or captured scene, and then using that information to render a digital object. The rendered object is thereby illuminated in much the same way as if it were a real object located in the scene, and may be inserted into a photographic image (or a frame of a video sequence) of the scene without appearing out of place.

Currently, several methods for capturing the global lighting of a point in space exists. Current solutions include taking several high-dynamic range pictures of a spherical mirror ball or taking high-dynamic range panoramic pictures with specialized cameras, among others. The simplest way is to use a regular camera to take a photograph of a mirrored ball placed in a scene. A mirrored ball actually reflects the entire world around it, not just the hemisphere toward the camera. Light rays reflecting off the outer circumference of the ball glance toward the camera from the back half of the environment. Another method of obtaining omnidirectional images using a regular camera is to shoot a mosaic of many pictures looking in different directions and combine them using an image stitching program as is known in the art. A good way to cover a particularly large area in each shot is to use a fisheye lens, which enables a user to cover the full field in as few as two images. A final technique is to use a special scanning panoramic camera, such as the PanoCaM™ camera commercially available from SpheronVR AG of Germany, which uses a vertical row of image sensors on a rotating camera head to scan across a 360-degree field of view. However, the specialized cameras and the spherical mirror balls need to be properly characterized and calibrated for taking the light measurements. Furthermore, these systems are adequate for capturing the lighting in only one point in space and one instant in time. However, VFX applications generally require lighting information to be available for an entire region in space, e.g., a set of a motion picture, and, sometimes, for a period of time while the lighting environment changes.

Other approaches use camera arrays to capture the light information. Since, in a camera array, the cameras are evenly positioned on a flat plane, the field of view of the camera array is limited to a certain angle and a certain spatial location. In VFX applications, generally a much larger field of view and light information (virtually at every location) is needed and, therefore, the current camera array solution has limitations for VFX applications.

Furthermore, existing systems do not collect lighting information from multiple locations and/or at multiple times. Existing systems do not systematically build lighting models that allow them to predict or interpolate the lighting in other locations and/or various times. Therefore, the functionality of existing systems for VFX compositing is limited to scenarios where capturing and modeling simple global lighting is sufficient.

SUMMARY

A method and system for modeling the lighting on a motion picture set at different positions in a set and at different times are provided. The method and system of the present disclosure collect lighting readings at different positions and times, as needed, to build a light model to be used for visual effects (VFX) compositing. Using the light model, the lighting can then be predicted or interpolated at other positions and/or times for which no specific light readings were obtained.

The method and system of the present disclosure collect light information at multiple positions and/or multiple times in some predetermined physical space (e.g., light readings at multiple positions, pictures or images at multiple points from which light information can be obtained, etc) and build a light model that represents the light distribution across space and/or time for the predetermined physical space. The light distribution model may characterize or approximate a radiance function in space and time, where the radiance is the light intensity at a given position and direction. The light distribution model can be built upon calculating the radiance values of specific points in the scene. The light distribution model may include how to interpolate the light at positions and times where no light information was captured. The light models can then be used for rendering objects (e.g., natural or CG elements) as if they were in that space. For the rendering process, light interpolation/prediction is performed at the desired position(s) in space and instant(s) in time. The rendered objects can then be composited in some scene, for example, the scene or background plate from where the light information was collected.

According to one aspect of the present disclosure, a method for modeling light in a predetermined physical space is provided. The method includes acquiring at least one first light reading at a first spatial location and at least one second light reading at a second spatial location, and building a model of the light distribution in the predetermined physical space based on the at least one first and second light readings. The method further includes further includes predicting light intensity at a spatial location based on the light distribution model.

In another aspect, the method further includes acquiring the at least one first light reading at least one first instant of time and at least one second instant of time and predicting light intensity at the first spatial location at another instant of time different from at least one first instant of time and at least one second instant of time based on the light distribution model.

According to another aspect of the present disclosure, a method for creating a new image of a scene includes acquiring an image of a scene at a predetermined time, determining three-dimensional coordinates for the scene, predicting light information at a selected spatial location of the scene based on the predetermined time and the three-dimensional coordinates, and rendering an object at the selected spatial location of the scene with the predicted light information.

In a further aspect, a system for modeling light in a predetermined physical space is provided. The system includes at least two sensors configured for acquiring at (east one first light reading at a first spatial location and at least one second light reading at a second spatial location, and a post-processing device configured for creating at least one light model, the post-processing device including a light model builder configured for determining a radiance of at least one third spatial location of the predetermined physical space from the at least one first and second light readings to create a model of light distribution in the predetermined physical space.

In another aspect, a program storage device readable by a machine, tangibly embodying a program of instructions executable by the machine to perform method steps for modeling light in a predetermined physical space is provided, the method includes acquiring at least one first light reading at a first spatial location and at least one second light reading at a second spatial location, and building a model of the light distribution in the predetermined physical space based on the at least one first and second light readings, wherein building the light distribution model includes determining a radiance of at least one third spatial location of the predetermined physical space from the at least one first and second light readings, and predicting light intensity at a fourth spatial location based on the light distribution model.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
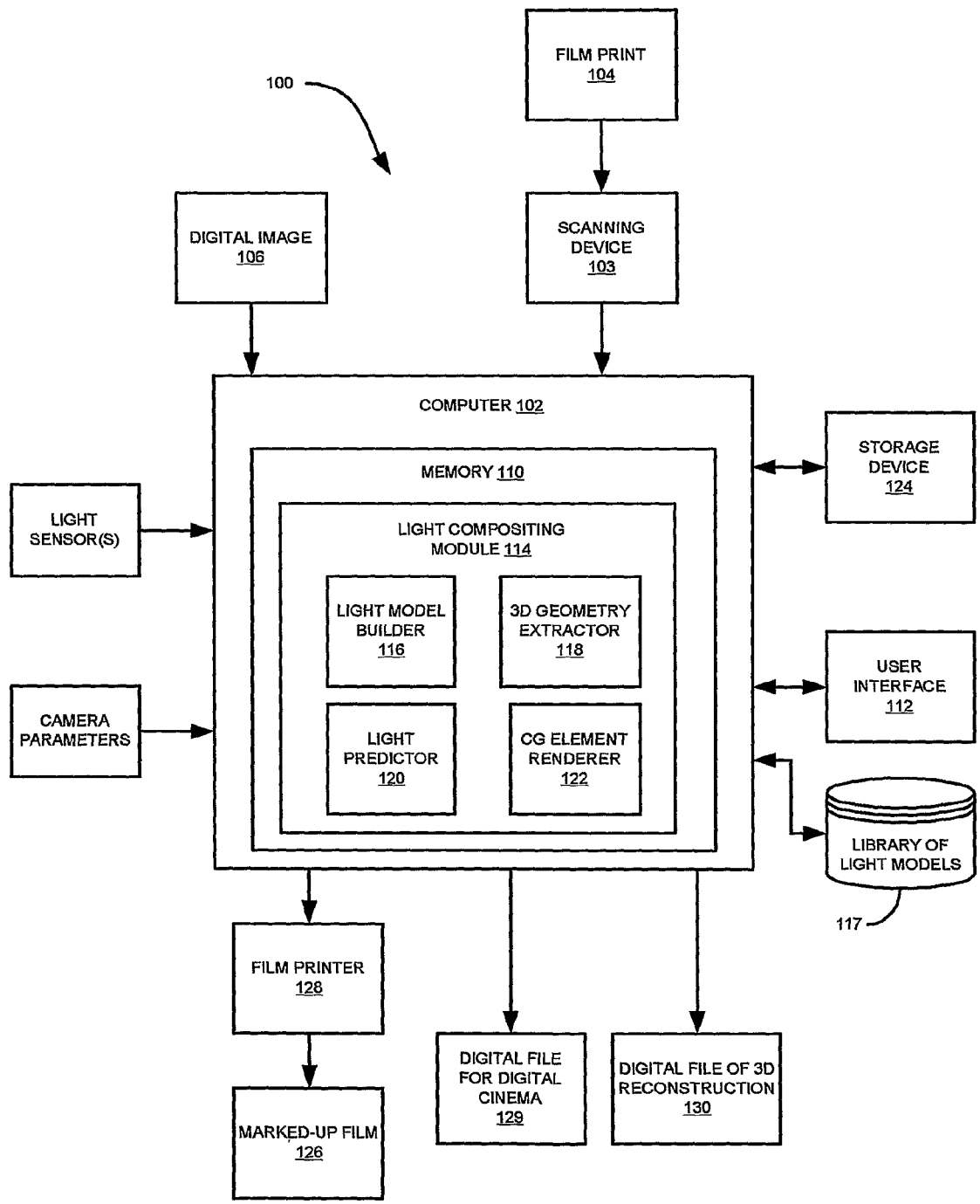
FIG. 1 is an exemplary illustration of a system for modeling light in time and space and using the light models for visual effects (VFX) compositing according to an aspect of the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure addresses the problem of modeling lighting across space and time, e.g., in a motion picture set. Lighting is very important for photorealistic VFX (visual effects) compositing in motion pictures. Compositing is a standard process widely used in motion picture production to combine foreground and/or background plates with Computer-Generated (CG) elements to achieve certain visual effects. CG elements will look more photorealistic if they are rendered and composited with the same lighting as the background and foreground plates. The present disclosure provides a method and system for modeling the lighting across space and time. The method and system of the present disclosure collect lighting readings at different positions and times, as needed, to build a model that represents the lighting in some predetermined space and time, e.g., a scene or set of a motion picture. Using the lighting model, the lighting can then be predicted or interpolated at other positions and/or times for which no specific light readings were obtained. The techniques of the present disclosure enable post-production processing to use the extracted light models for improving VFX compositing in motion pictures for complex scenes where lighting changes in space and/or time. Furthermore, by collecting light information at different instants in time, lighting can be interpolated at other times, which is very useful when trying to characterize varying outdoors lighting, e.g., during sunset.

Referring now to the Figures, exemplary system components according to an embodiment of the present disclosure are shown in FIG. 1. A scanning device 103 may be provided for scanning film prints 104, e.g., camera-original film negatives, into a digital format, e.g. Cineon-format or SMPTE DPX files. The scanning device 103 may comprise, e.g., a telecine or any device that will generate a video output from film such as, e.g., an Arri LOcPrO™ with video output. Alternatively, files from the post production process or digital cinema 106 (e.g., files already in computer-readable form) can be used directly. Potential sources of computer-readable files include, but are not limited to, AVID™ editors, DPX files, D5 tapes and the like.

Scanned film prints are input to a post-processing device 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In addition, various other peripheral devices may be connected to the computer platform by various interfaces and bus structures, such a parallel port, serial port or universal serial bus (USB). Other peripheral devices may include additional storage devices 124 and a printer 128. The printer 128 may be employed for printing a revised version of the film 126 wherein a scene may have been altered or replaced using 3D modeled objects as a result of the techniques described below.

Alternatively, files/film prints already in computer-readable form 106 (e.g., digital cinema, which for example, may be stored on external hard drive 124) may be directly input into the computer 102. Note that the term "film" used herein may refer to either film prints or digital capture. It is to be appreciated that whether the film is scanned or already in digital format, the digital file of the film will include indications or information on locations of the frames, e.g., a frame number, time from start of the film, etc. Each frame of the digital motion picture will include one image, e.g., $I_1, I_2, \ldots I_n$.

A software program includes a light compositing module 114 stored in the memory 110 for rendering and compositing objects into images taking into account predicted lighting. The light compositing module 114 includes a light model builder 116 for generating at least one light model representing radiance information of a predetermined spatial location, e.g., a scene or set. The at least one generated light model is stored in a library of light models 117 for later use when rendering a scene. A 3D geometry detector 118 is provided for generating the 3D geometry of the scene capture by the 2D image or parts of the 2D image. The 3D geometry detector 118 may also identify objects either manually by outlining image regions containing objects by image editing software or by isolating image regions containing objects with automatic detection algorithms. The light compositing module 114 also includes a light predictor 120 for predicting the light environment or radiance of objects that are to be placed in a scene. A CG element renderer 122 is provided for rendering objects in a scene with lighting information generated by the light predictor 120. Renderers are known in the art and include, but are not limited to, LightWave 3D, Entropy and Blender.

Figure 2:
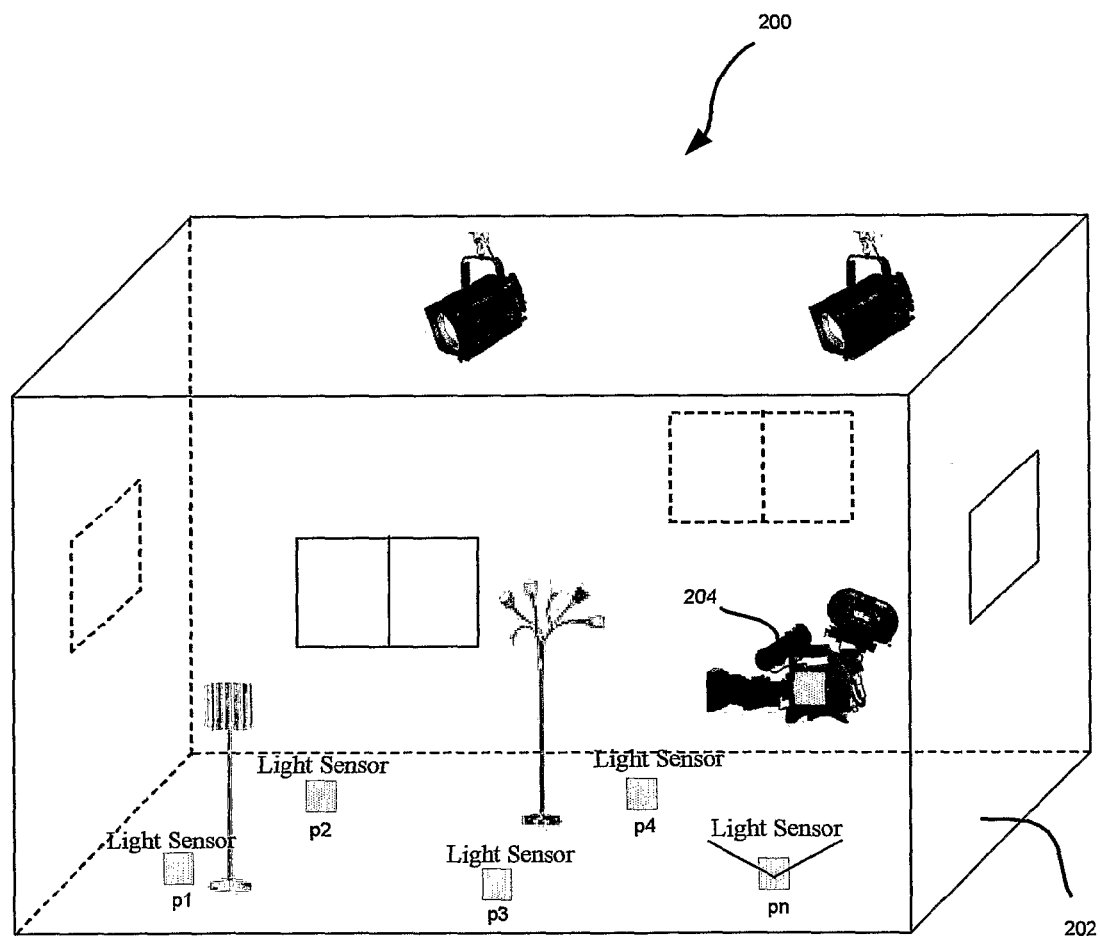
FIG. 2 is an exemplary system setup on a possible set for modeling light and using the light models for visual effects (VFX) compositing according to an aspect of the present disclosure.

FIG. 2 depicts an exemplary system setup 200 for collecting light readings and modeling light on a motion picture set for VFX compositing, where lighting information is employed for realistic compositing. For this application, a network of light sensors, e.g., p1, p2, p3 ... pn, are distributed around a set 202 that also collect positional information. The set 202 is a predetermined physical space used for performing one or more scenes of a motion picture. Additional sensors may be attached to the camera(s) 204 to track their location, orientation and motion. Lighting information could be captured before, during, or after the actual shooting. Instead of or in addition to a network of light/positional sensors, one or more autonomous robots equipped with light sensors could be programmed to collect the necessary light and position information to cover better the target space including occluded areas. Based on the detected variations of light, the autonomous robots could decide to take more or fewer light readings. The information from the light sensors, e.g., p1, p2, p3 ... pn, and/or camera(s) 204, e.g., camera parameters, may be manually input to the system 100 via the user interface 112 or may be automatically transmitted to system 100 via hardwired or wireless connectivity, as illustrated in FIG. 1.

Figure 3:
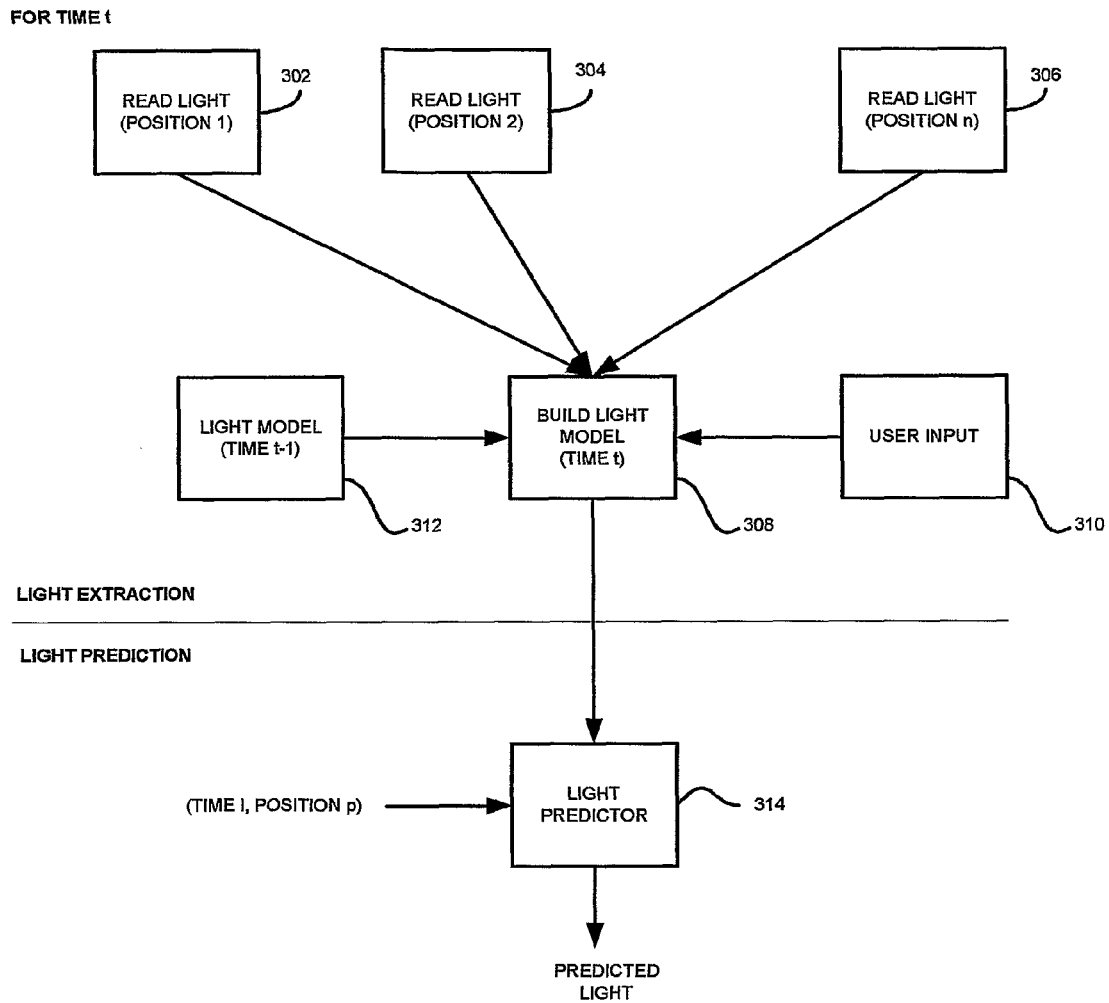
FIG. 3 is a flow diagram of an exemplary method for modeling light in time and space and predicting light using the light models according to an aspect of the present disclosure.

FIG. 3 illustrates a flow chart for a light extraction and prediction technique of the present disclosure. The system collects lighting readings at different positions and times using light sensors, as needed, to build a model that represents the lighting in some space and time. Using the built lighting model, the lighting can then be predicted or interpolated at other positions and/or times for which no specific light readings were directly obtained by the light sensors.

Figure 4:
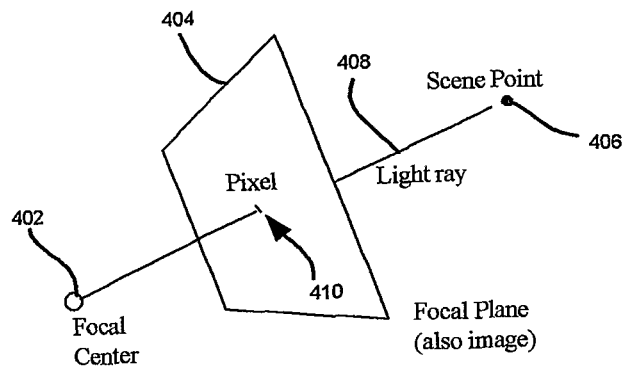
FIG. 4 illustrates a technique for converting a pixel intensity for one image to a light and direction intensity according to an aspect of the present disclosure.

In steps 302, 304 and 306, color intensity and direction of the light in a predetermined physical space, e.g., set 202, are captured, as well as the spatial location of the sensors p1, p2, ... pn. The light intensity and direction can be captured in a variety of ways. One exemplary method is to use a camera sensor to take one or more pictures. The pictures encode the light intensities from different directions as will be described in relation to FIG. 4. Assuming the focal center 402 and focal plane 404 of the camera is known (can be obtained by calibration), the light direction and intensity of a scene point 406 can be calculated by passing a ray 408 from the focal center 402 to the particular point 406 through the focal plane 404, which is also the image plane. The pixel value of the point 410 in the focal plane is proportional to the light intensity of the scene point 406, and the light direction is specified by the ray 408. The ray 408 determines a direction or angle that corresponds to the direction of the light from the scene point 406 to the focal center 402.

In step 308, the light information collected from different positions is used to reconstruct the radiance. The radiance is a 5-dimensional function which encodes the distribution of light in space or the light direction and intensity at every point in free space. Formally, radiance is defined as the power (amount of energy per unit time) traveling at some point in a specified direction, per unit area perpendicular to the direction of travel, per unit solid angle. The radiance is, therefore, a function of the position and direction. Given a point $P=(x, y, z)$ and a direction with spherical coordinates $\theta$ and $\phi$ in some coordinate system whose z axis is along the surface normal, the radiance can be denoted as follows:

$$L(P,\theta,\phi) \tag{1}$$

The measurements taken in different points over time on the set enable the system to create a model for this 5D function across time. Alternatively, the user, at step 310, may input the intensity and location of the actual light sources on set and/or additionally input metadata to the system, e.g., camera parameters, 3d geometry, etc. Light models are determined, at step 312, for various sampled times which can be used to build the light model for the current time since the lighting can be assumed not to change drastically with time.

If the radiance across time can be fully reconstructed, then the light information at every spatial location can be simply obtained by evaluating the radiance function $L(P, \theta, \phi)$ at the specified spatial location. Since in the system of the present disclosure, the camera sensors are loosely distributed across different locations, reconstructing the full radiance in general may not be possible. However, the radiance can be reconstructed up to certain desired resolution by increasing the number of sensors and optimizing the sensor locations given some lighting-conditions. For example, few sensors and readings will be needed in uniform lighting environments like outdoors scenes.

Figure 5:
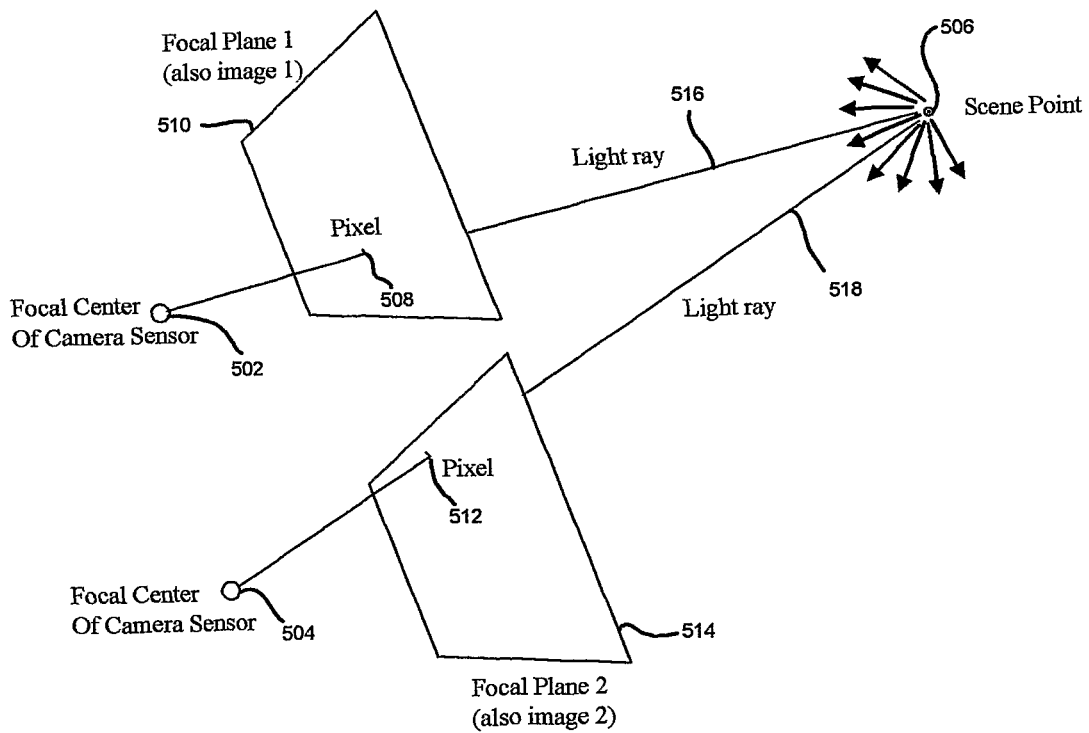
FIG. 5 illustrates a technique for matching pixels and using triangulation between at least two images to identify a scene point in a three-dimensional (3D) space according to an aspect of the preset disclosure.

For the case of the camera sensor system, the radiance can be partially reconstructed by finding the correspondence of the pixels of at least two images captured by the sensors. This technique is illustrated in FIG. 5. If the field of view of the two camera sensors 502, 504 overlap, then it is possible to find the two pixels in the captured images that correspond to a single scene point 506 in the 3D space, e.g., pixels 508 in image 510 and pixel 512 in image 514. If the two corresponding pixels 508, 512 are identified, the 3D position of the scene point 506 can be calculated by intersecting two rays 516, 518 that pass from the focal centers 502, 504 to the image pixels 508, 512 to the 3D point 506. This is a method known as triangulation. Finding the correspondence of the pixel points can be realized by various methods. The most direct way is to match the color value of the pixels. In addition, spatial continuity constraints can be incorporated to make pixel matching more reliable. For example, it can be assumed that the disparity between pixels that correspond to the same scene point varies smoothly almost everywhere, and that only a small fraction of an image is composed of edges that are discontinuous in depth. Therefore, the disparity of a matched point pair and that of its nearest neighbor point pair should be alike.

For a reliable triangulation, it is also necessary to know the camera sensor parameters. The camera sensor parameters can be known in advance or calculated by calibration. The camera sensor parameter calculations will be much simpler if the focal center of the camera sensor is made parallel to the floor. If the two camera sensors have the same zoom factor and other intrinsic parameters, then the two camera sensors will have the same settings and, therefore, the same projection geometry. As a result, as long as the positions of the two camera sensors are known, the scene point can be found by triangulation. Once the scene point location is found, if the scene surface is assumed to be a Lambertian surface, then the light direction and intensity can be fully recovered at that particular scene point. This is illustrated in FIG. 5. A Lambertian surface is a surface whose directional reflectance does not depend on illumination direction. That means that the radiance leaving the surface is independent of the angle. If the scene surface is not a Lambertian surface, then the recovered light direction and intensity will be an approximation.

The number of the camera sensors is chosen according to the required resolution of the radiance and depends on to the light conditions. More camera sensors would result in higher spatial resolution of the radiance; whereas, fewer camera sensors may result in occlusions of some scene areas. In the capture process, camera sensors may be dynamically added so that the important scene areas can be covered based on the complexity of the lighting.

Figure 6:
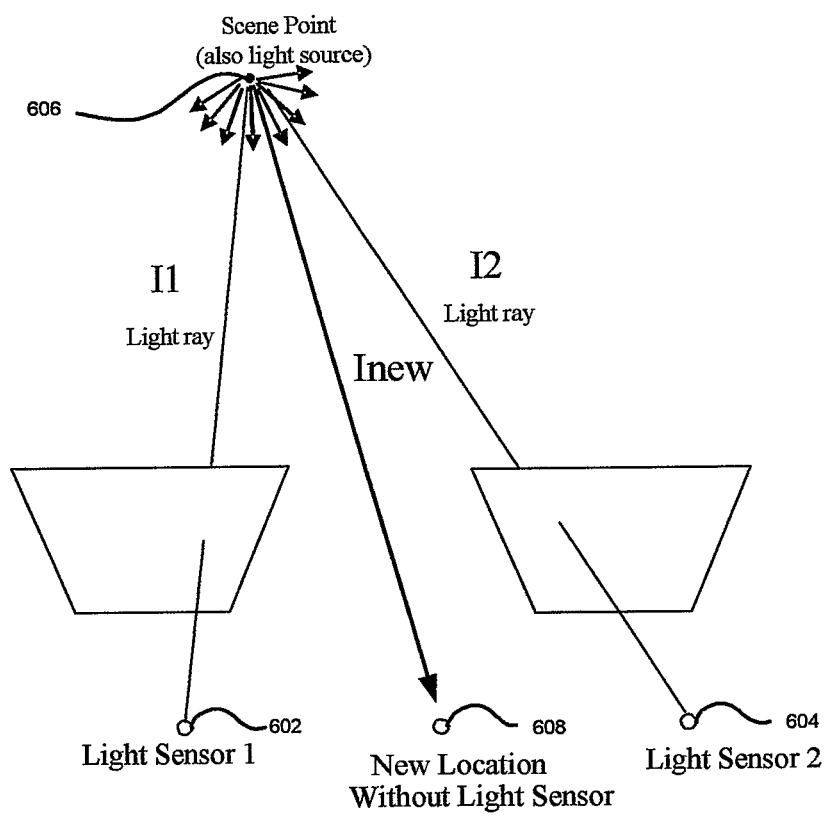
FIG. 6 illustrates a technique for interpolating intensity and direction of light at a new location in a scene according to an aspect of the present disclosure.

In step 314, the system 100 utilizes the reconstructed light model to predict the light information at an intermediate location, where the lighting information may need to be known for VFX compositing. If the radiance is fully reconstructed or approximated for a given time, then lighting information can be readily obtained by evaluating the 5D radiance function at the specified location. But in most cases, the radiance is not fully reconstructed, then the light information will be inferred at the specified location by interpolation. FIG. 6 illustrates a particular prediction scheme using linear interpolation. Assuming that the position and the light intensity of the light source 606 is known by triangulation, then, the intensity of the light at a new location, e.g., scene point 608, can be computed as a combination of the light reading at the locations having light sensors, e.g., light sensor 602 and light sensor 604. For instance, if there are two light sensors, then the light intensity for a new location 608 is $Inew=(I1+I2)/2$, where I1 and I2 are light readings at the sensor locations 602 and 604 respectively, and Inew is the interpolated light reading at scene point 608.

Figure 7:
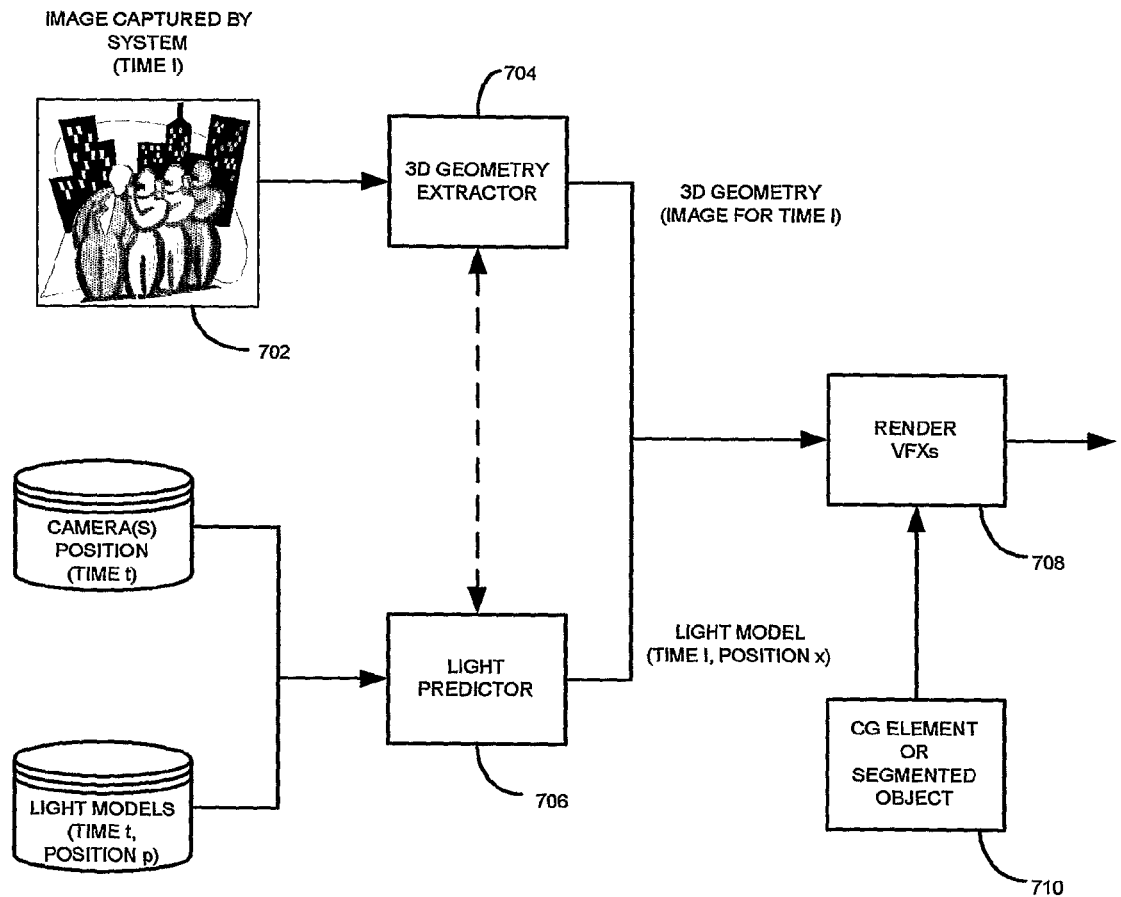
FIG. 7 is a flow diagram of an exemplary method for VFX compositing according to an aspect of the present disclosure.

FIG. 7 shows a flow chart for performing VFX compositing using the light models obtained from the system 100 of the present disclosure. The compositing process combines background and/or foreground plates with CG elements to realize certain visual effects. The foreground and background plates may have been captured by different sources. In step 702, an image, e.g., a background plate, is captured by system 102 at time I. The position of the camera capturing the image will be recorded or manually input into the post-processing device 102. In one embodiment, the post-processing device 102 obtains the digital master image files in a computer-readable format. The digital video file may be acquired by capturing a temporal sequence of images with a digital camera. Alternatively, the image sequence may be captured by a conventional film-type camera. In this scenario, the film is scanned via scanning device 103 and the process proceeds to step 202. The positions of the sensors, e.g., cameras, of the sensor network, as illustrated in FIG. 2, will also be recorded and/or input into the system.

Next, in step 704, the 3D geometry extractor 118 will generate the 3D geometry of the real scene. The 3D geometry extractor 118 may segment objects from the captured images and determine the 3D coordinates, e.g., position p, of the object(s) in the scene, e.g., by using the position of the camera used to acquired the image. The camera sensor network described above may collect information that is useful for reconstructing the 3D geometry of the scene and the set. The 3D geometry extractor 118 can therefore interact and collaborate with the light predictor 120 to predict, at step 706, the lighting information, e.g., radiance, of the element/object to be inserted.

An operator of the system determines where and when a CG element/segmented object is to be rendered and composited into the scene. Once a position and time is determined for inserting the CG element/segmented object, the light predictor will employ at least one light distribution model previously built by system 100 as described above. The 3D geometry of the scene and the light model, e.g., for time I (determined by the capture time of the image) and position where the CG element is to be rendered, is sent to the CG element renderer 122 to render, at step 708, the CG element. The rendered element may then be inserted into the image, for example, by a compositor (not shown). Objects can be extracted, at step 710, from other images to be rendered and composited into the images following this procedure instead of pure CG elements.

The rendered CG element may then be saved in a digital file 130 separate from the file containing the image(s). The digital file of CG element 130 may be stored in storage device 124 for later retrieval, e.g., during an editing stage of the film where an CG element may be inserted into an image where the object was not previously present, for example, by the compositor. Furthermore, where an entire motion picture has been edited to include CG elements created by the techniques described above, a complete digital file for digital cinema 129 may be created and stored in storage device 124.

A method and system for modeling light across time and space have been described. The method and system of the present disclosure collect lighting readings at different positions and times, for example, on a motion picture scene or set, to build a light model to be used for visual effects (VFX) compositing. Using the light model, the lighting can then be predicted or interpolated at other positions and/or times for which no specific light readings were obtained. The more the lighting for the CG elements or objects match the background and foreground plate's of a scene or set, the more photorealistic the VFXs will look. Since the method and system of the present disclosure can model and extract lighting more accurately across the entire set and time, more photorealistic results can be obtained than from existing systems.

Although the embodiment which incorporates the teachings of the present disclosure has been shown and described in detail herein, those skilled in the art can readily devise many other varied embodiments that still incorporate these teachings. Having described preferred embodiments for a method and system for modeling light in time and space (which are intended to be illustrative and not limiting), it is noted that modifications and variations can be made by persons skilled in the art in light of the above teachings. It is therefore to be understood that changes may be made in the particular embodiments of the disclosure disclosed which are within the scope and spirit of the disclosure as outlined by the appended claims.

What is claimed is:

1. A method performed by a computer system for modeling light in a predetermined physical space, the method comprising:
   acquiring at least one first light reading at a first spatial location and at least one second light reading at a second spatial location; and
   building a model of the light distribution in the predetermined physical space based on the at least one first and second light readings, the step of building a model including determining a radiance of at least one third spatial location of the predetermined physical space using a triangulation of the at least one first and second light readings.

2. The method as in claim 1, further comprising predicting light intensity at a fourth spatial location based on the light distribution model.

3. The method as in claim 2, wherein the light intensity at the fourth spatial location is determined by interpolating the at least one first light reading and the at least one second light reading.

4. The method as in claim 1, further comprising acquiring the at least one first light reading at least one first instant of time and at least one second instant of time.

5. The method as in claim 4, further comprising predicting light intensity at the first spatial location at another instant of time different from at least one first instant of time and at least one second instant of time based on the light distribution model.

6. The method as in claim 1, wherein the at least one first and second light readings include at least a light intensity and direction of light at the least one first and second spatial locations.

7. The method as in claim 6, wherein the at least one first and second light readings are acquired by at least one camera, the acquiring the at least one first and second light readings further comprises:
   determining a focal center and focal plane of the camera;
   passing a ray from the focal center to the at least one spatial location in the predetermined physical space; and
   determining a point in the focal plane where the ray passes through.

8. The method as in claim 6, wherein a pixel value of the point in the focal plane is proportional to the color intensity of the at least one spatial location in the predetermined physical space; and wherein an angle of the ray from the focal center to the at least one spatial location in the predetermined physical space determines the direction of the light from the at least one spatial location.

9. A system for modeling light in a predetermined physical space, the system comprising:
   at least two sensors configured for acquiring at least one first light reading at a first spatial location and at least one second light reading at a second spatial location; and
   a post-processing device configured for creating at least one light model; the post-processing device including:
   a light model builder configured for determining a radiance of at least one third spatial location of the predetermined physical space using a triangulation of the at least one first and second light readings of the at least one first and second light readings to create a model of light distribution in the predetermined physical space.

10. The system as in claim 9, wherein the post-processing device further comprises a light predictor configured for predicting light intensity at a fourth spatial location based on the determined light distribution model.

11. The system as in claim 10, wherein the at least two sensors are further configured for acquiring the at least one first light reading at least one first instant of time and at least one second instant of time.

12. The system as in claim 11, wherein the light predictor is further configured for predicting light intensity at the first spatial location at another instant of time intermediate different from at least one first instant of time and at least one second instant of time based on the light distribution model.

13. The system as in claim 10, wherein the post-processing device is further configured for acquiring an image of a scene at a predetermined time, the post-processing device further comprising a geometry extractor configured for determining three-dimensional coordinates for the scene, wherein the light predictor predicts light information at a selected spatial location of the scene based on the predetermined time and the three-dimensional coordinates.

14. The system as in claim 9, wherein the at least one first and second light readings include a light intensity and direction of light at the least one first and second spatial locations.

15. A program storage device readable by a machine, tangibly embodying a program of instructions executable by the machine to perform method steps for modeling light in a predetermined physical space, the method comprising:
    acquiring at least one first light reading at a first spatial location and at least one second light reading at a second spatial location; and
    building a model of the light distribution in the predetermined physical space based on the at least one first and second light readings, wherein building the light distribution model includes determining a radiance of at least one third spatial location of the predetermined physical space using a triangulation of the at least one first and second light readings of the at least one first and second light readings; and
    predicting light intensity at a fourth spatial location based on the light distribution model.

* * * * *